US012210260B1

(12) United States Patent
Chen

(10) Patent No.: US 12,210,260 B1
(45) Date of Patent: Jan. 28, 2025

(54) VEHICLE INTERIOR LIGHTING SYSTEM USING LIQUID LENS

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/652,251

(22) Filed: May 1, 2024

(51) Int. Cl.
*G02F 1/1516* (2019.01)
*B60Q 3/208* (2017.01)
*B60Q 3/60* (2017.01)
*B60Q 3/76* (2017.01)
*B60Q 3/82* (2017.01)

(52) U.S. Cl.
CPC ......... *G02F 1/15165* (2019.01); *B60Q 3/208* (2017.02); *B60Q 3/60* (2017.02); *B60Q 3/76* (2017.02); *B60Q 3/82* (2017.02)

(58) Field of Classification Search
CPC ... B60Q 3/76; B60Q 3/82; B60Q 3/60; B60Q 3/208; G02F 1/15165
See application file for complete search history.

(56) References Cited

U.S. PATENT DOCUMENTS

| | | | | |
|---|---|---|---|---|
| 10,449,896 | B1 * | 10/2019 | Vemulapati | F21V 5/04 |
| 2005/0276056 | A1 * | 12/2005 | Tiesler | B60Q 3/82 |
| | | | | 362/544 |
| 2010/0238677 | A1 * | 9/2010 | de Laine | B60Q 3/64 |
| | | | | 362/546 |
| 2017/0305327 | A1 * | 10/2017 | Hoffmann | F21S 41/63 |
| 2020/0207264 | A1 * | 7/2020 | Camras | H05B 47/11 |
| 2020/0393105 | A1 * | 12/2020 | Lin | F21S 41/645 |
| 2022/0024380 | A1 | 1/2022 | Chen et al. | |
| 2023/0078512 | A1 * | 3/2023 | Peterson | B60Q 3/80 |
| | | | | 362/494 |

FOREIGN PATENT DOCUMENTS

| | | |
|---|---|---|
| EP | 3727937 A1 | 10/2020 |
| ES | 2411722 A1 | 7/2013 |
| KR | 20180106611 A | 10/2018 |

OTHER PUBLICATIONS

Edmund Optics Worldwide, "Liquid Lens Features, Applications, and Technology," Sections 7.2-7.4 of the Imaging Resource Guide, dated Apr. 15, 2024, 6 pages, https://www.edmundoptics.com/knowledge-center?query=&categoryid=33663&/, last accessed Jun. 7, 2024.

* cited by examiner

*Primary Examiner* — Christopher E Dunay
(74) *Attorney, Agent, or Firm* — Vichit Chea; Price Heneveld LLP

(57) ABSTRACT

A vehicle lighting system comprising a light source for generating light illumination, a liquid lens optically aligned with the light source to receive the light illumination and generate an output beam, and a controller configured to control electric power supplied to the liquid lens. The controller applies a first voltage to the liquid lens to generate a first output beam having a first beam size and generates a second voltage to the liquid lens to generate a second output beam having a wider second beam size.

17 Claims, 3 Drawing Sheets

VEHICLE INTERIOR LIGHTING SYSTEM USING LIQUID LENS

FIELD OF THE DISCLOSURE

The present disclosure generally relates to vehicle lighting systems, and more particularly relates to an interior lighting system that provides both a reading light and a dome light.

BACKGROUND OF THE DISCLOSURE

Motor vehicles are commonly equipped with various lighting systems for illuminating the passenger compartment of the motor vehicle. For example, motor vehicles are commonly equipped with reading lamps to provide a focused light illumination beam proximate to a passenger seated in the vehicle and a separate dome lamp to provide a generally wider light illumination beam. It may be desirable to provide for both a reading light and a dome light with a vehicle lighting system that is integrated and efficient.

SUMMARY OF THE DISCLOSURE

According to a first aspect of the present disclosure, a vehicle lighting system has a light source for generating light illumination. A liquid lens is optically aligned with the light source to receive the light illumination and generate an output beam. A controller is configured to control electric power supplied to the liquid lens. The controller applies a first voltage to the liquid lens to generate a first output beam having a first beam size and a second voltage to the liquid lens to generate a second output beam having a wider second beam size.

Embodiments of the first aspect of the present disclosure can include any one or a combination of the following features:
  the first voltage is a non-zero voltage and the second voltage is zero voltage;
  a user input for selecting between the first output beam and the second output beam;
  the user input is a user actuatable switch;
  the first output beam is a reading light beam and the second output beam is a dome light beam;
  the liquid lens comprises a container having an optical polymer membrane containing a fluid and an actuator with a voice coil to change the shape of the optical polymer membrane;
  the light source and liquid lens are located proximate to a roof of a vehicle;
  the liquid lens comprises an optical polymer membrane; and
  the liquid lens further comprises a first fluid medium and a second fluid medium separated by the optical polymer medium.

According to a second aspect of the present disclosure, a vehicle lighting system has a light source for generating light illumination. A liquid lens is optically aligned with the light source to receive the light illumination and generate an output beam. The liquid lens has a first fluid medium and a second fluid medium. An optical polymer membrane is disposed between the first and second fluid mediums. A controller is configured to control electric power supplied to the liquid lens. The controller applies a first voltage to the liquid lens to generate a first output beam having a first beam size and a second voltage to the liquid lens to generate a second output beam having a wider second beam size.

Embodiments of the second aspect of the present disclosure can include any one or a combination of the following features:
  the first voltage is a non-zero voltage and the second voltage is zero voltage;
  a user input for selecting between the first output beam and the second output beam;
  the user input is a user actuatable switch;
  the first output beam is a reading light beam and the second output beam is a dome light beam;
  the liquid lens comprises a container containing the optical polymer membrane and the first fluid medium and the second fluid medium, and an actuator with a voice coil to change the shape of the membrane; and
  the light source and liquid lens are located proximate to a roof of a vehicle.

The present disclosure further contains a method of controlling a vehicle lighting system on a vehicle. The method includes activating a light source to generate light illumination onto a liquid lens to generate an output beam, wherein a first voltage is applied to the liquid lens to generate a first output beam having a first beam size, receiving a user input to activate a second size beam, and applying a second voltage to the liquid lens in response to the user input to generate a second output beam having the second beam size.

Embodiments of the third aspect of the present disclosure can include any one or a combination of the following features:
  the first voltage is a non-zero voltage and the second voltage is a zero voltage;
  the first output beam is a reading light beam and the second output beam is a dome light beam; and
  the liquid lens comprises an optical polymer membrane disposed between first and second fluid mediums.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
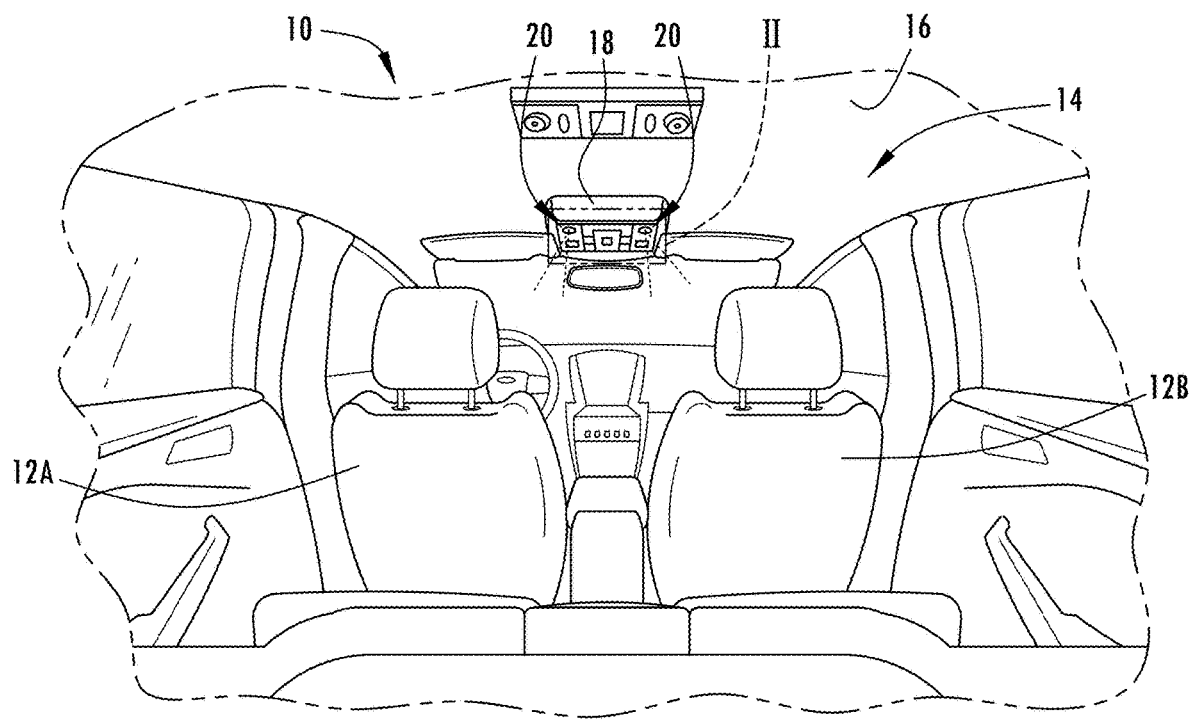
FIG. 1 is a forward-looking perspective view of a passenger compartment of a motor vehicle equipped with an overhead console having a vehicle lighting system, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle lighting system and method of controlling a vehicle lighting system on a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a passenger compartment 14 of a motor vehicle 10 is generally illustrated equipped with a vehicle lighting system 20, according to one embodiment. The vehicle 10 may be a motor vehicle, for example, a wheeled motor vehicle which may include a car, a truck, a van, a bus, an SUV, etc. The passenger compartment 14 may be equipped with a seating arrangement having one or more seats 12 for seating vehicle occupants such as a driver of the motor vehicle and one or more passengers. It should be appreciated that the motor vehicle 10 may include any of a number of seats 12, including a front row of seats having a driver's seat 12A and a passenger seat 12B, and various other passenger seats located at one or more locations throughout the passenger compartment 14. The seating arrangement may include two or three seats, for example, within each row of seating and there may be multiple rows of seating within the passenger compartment 14 of the motor vehicle 10. It should be appreciated that the seating area for each seat may be illuminated by a vehicle lighting system 20 for providing a dome light and reading light directed towards the corresponding seating area.

The vehicle lighting system 20 is shown located in the cabin interior defining the passenger compartment 14 above the seating arrangement and proximate to an underside of a roof 16 of the vehicle body, according to one example. More specifically, the vehicle lighting system 20 is shown located in an overhead console 18 that, in turn, is assembled to an underlying component of the roof, such as a headliner. As such, the overhead console 18 is located at an elevation generally above one or more of the vehicle seats 12, and may be located centrally between the front row driver's seat 12A and the passenger's seat 12B. It should be appreciated that the vehicle lighting system 20 may be located elsewhere in the passenger compartment 14 such as on the underside of the roof 16, in a mirror, or in a support pillar, for example.

The vehicle lighting system 20 may be located at multiple locations in the vehicle 10 to provide lighting directed to one or more seats.

Figure 2:
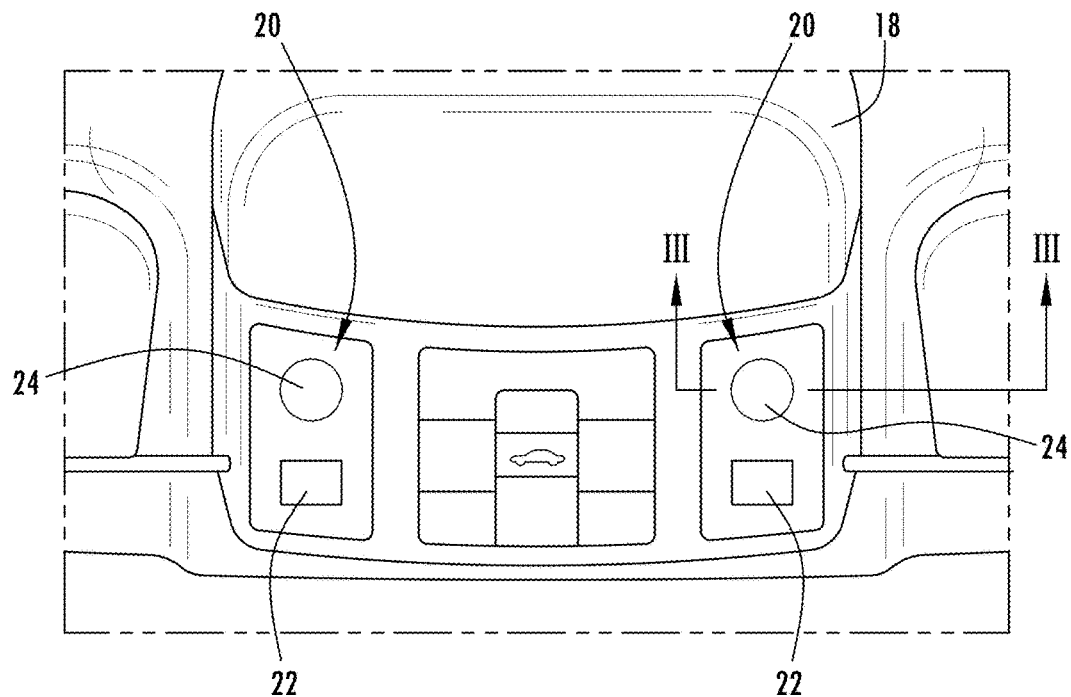
FIG. 2 is an enlarged view of the overhead console having the vehicle lighting system of FIG. 1.

As shown in FIGS. 1 and 2, the overhead console 18 may include various features including user control inputs such as pushbutton or proximity switches for controlling various features or functions on the motor vehicle 10. The user control inputs may include manually actuatable inputs for controlling features, such as controlling lighting, moonroof and sunshade movement, and other functions. In addition, the overhead console 18 is equipped with a pair of vehicle lighting systems 20 that may provide both a reading light and a dome light for the driver's seat 12A and the passenger's seat 12B. In the example shown, the overhead console 18 has a pair of lighting systems 20, with one lighting system on the driver side for illuminating the seating area of the driver's seat 12A, and the other lighting system on the passenger side for illuminating the seating area for the passenger seat 12B, each lighting system 20 having a single lamp for illuminating a reading light into a region proximate to the corresponding seat within a relatively narrow illumination beam and is selectively controllable to switch to illuminate a dome light with a wider illumination beam. It should be appreciated that the overhead console 18 may be equipped with other lighting systems 20 which may include a single lamp for providing both a reading light and a dome light proximate to each of the plurality of seats such as the seats in the front row seating including the driver and passenger seats 12A and 12B, and may have separate lights for lighting illumination for seats in rearward rows of seating.

Each vehicle lighting system 20 may include a light source which may include one or more light emitting diodes (LEDs) such as a single color LED or red-green-blue LEDs (RGB LEDs) that may generate light of various colors based on color mixing of red, blue and green LEDs. The vehicle lighting system 20 may generate as an output a reading light in an output beam directed to a region proximate to a location where the driver or one or more passengers may be seated in seats in the motor vehicle 10. The vehicle lighting system 20 may be selectively activated to illuminate a narrow band light beam in a cone-shaped region to enable a passenger sitting in a seat to view reading material, such as books, maps, etc., when configured as a reading light, particularly when ambient lighting conditions in the passenger compartment 14 of the motor vehicle 10 are insufficient. The vehicle lighting system 20 may also be illuminated in a wide light beam to illuminate a broader cone-shaped region of the motor vehicle 10 when configured as a dome light.

The vehicle lighting system 20 further includes a dynamic optical lens in the form of a liquid lens 24 optically aligned with the light output of the light source to provide dynamic beam shaping to cause the optical power and therefore the focal length to shift which varies the size of the light output beam. The liquid lens 24 is electrically controlled to allow for the light output to be focused to illuminate in a narrow beam reading light or changed to defocus to a wider beam dome light. The reading light has a narrow cone-shaped light beam generally focused within a more limited narrow beam, and the dome light has a broader cone-shaped illumination beam. The liquid lens 24 includes a container having a reconfigurable optical membrane and fluid defining an actuator with a voice coil. The actuator with the voice coil may be electrically energized to cause the fluid to change the shape of the optical membrane, thereby defining the optical properties of the liquid lens as it moves between a first shape and a second shape to focus and defocus the light beam. In the first shape, the liquid lens projects light transmitted therethrough in a wider beam for the output dome light, and in a second shape transmits light therethrough in a narrower beam for the output reading light.

As illustrated in FIG. 2, the overhead console 18 may include one or more user inputs, such as pushbutton switches 22 for activating each of the lighting systems 20 to turn the lamp on and off and further for selecting the operating mode such as one of the dome light mode and reading light mode. In the example shown, a user may actuate the pushbutton switch 22 located proximate to the vehicle lighting liquid lens 24 to turn the corresponding lighting system 20 on and may further actuate the pushbutton switch 22 to sequentially select the operating reading or dome light mode and to turn the vehicle lighting system 20 off. For example, a user may depress the pushbutton switch 22 once to turn on the vehicle lighting system 20 in a first mode such as a reading mode and may further depress the pushbutton switch 22 a second time to switch the mode to the dome light, for example. It should be appreciated that the vehicle lighting system 20 may otherwise include other types of user inputs such as an integrated user input built into the liquid lens 24 that allows the user to depress a housing of the liquid lens 24 to activate the vehicle lighting system 20 and to select the reading light mode and dome light mode by contacting or depressing the liquid lens 24. It should be appreciated that the user input may include a mechanical pushbutton actuated switch or a proximity switch, such as a capacitive switch, for example.

Figure 3:
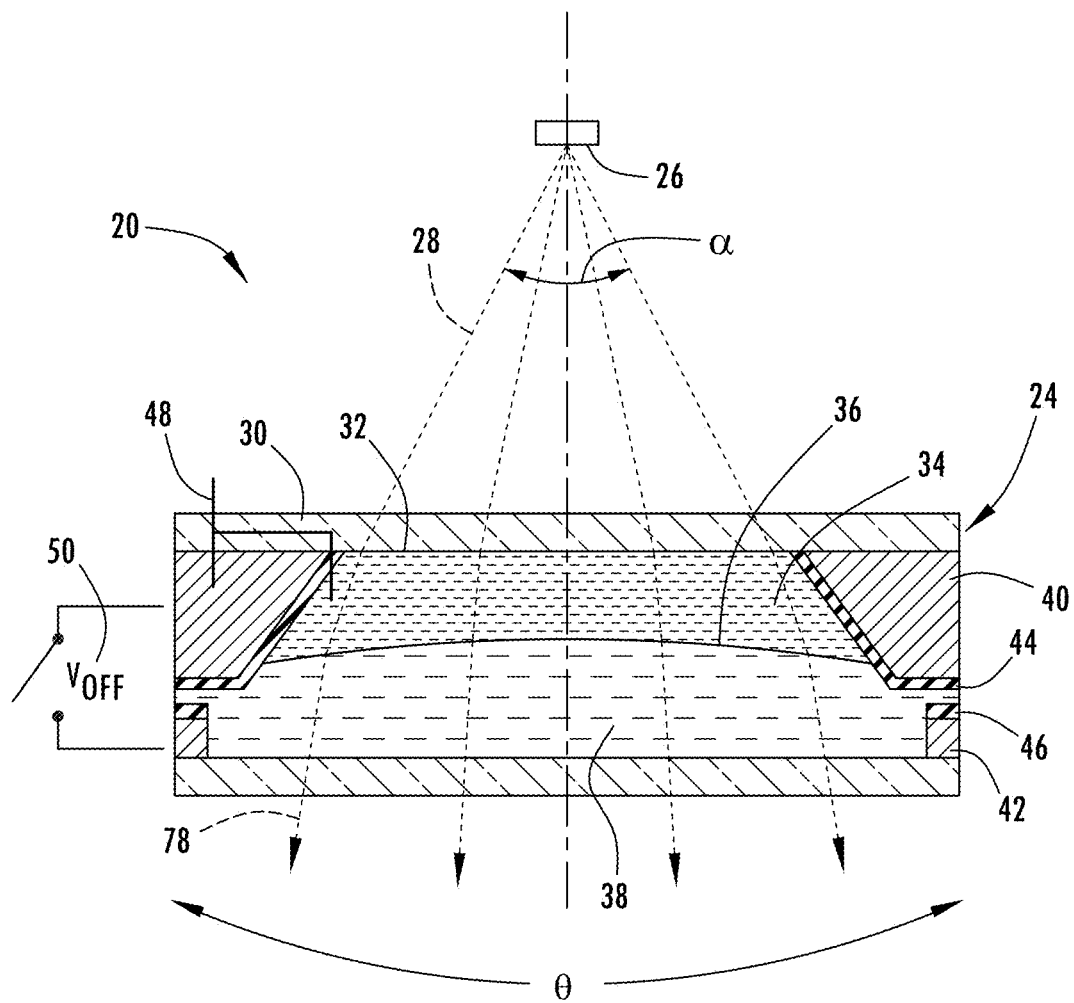
FIG. 3 is a cross-sectional view taken through line III-III of FIG. 2 illustrating the vehicle lighting system configured as a dome light.
Figure 4:
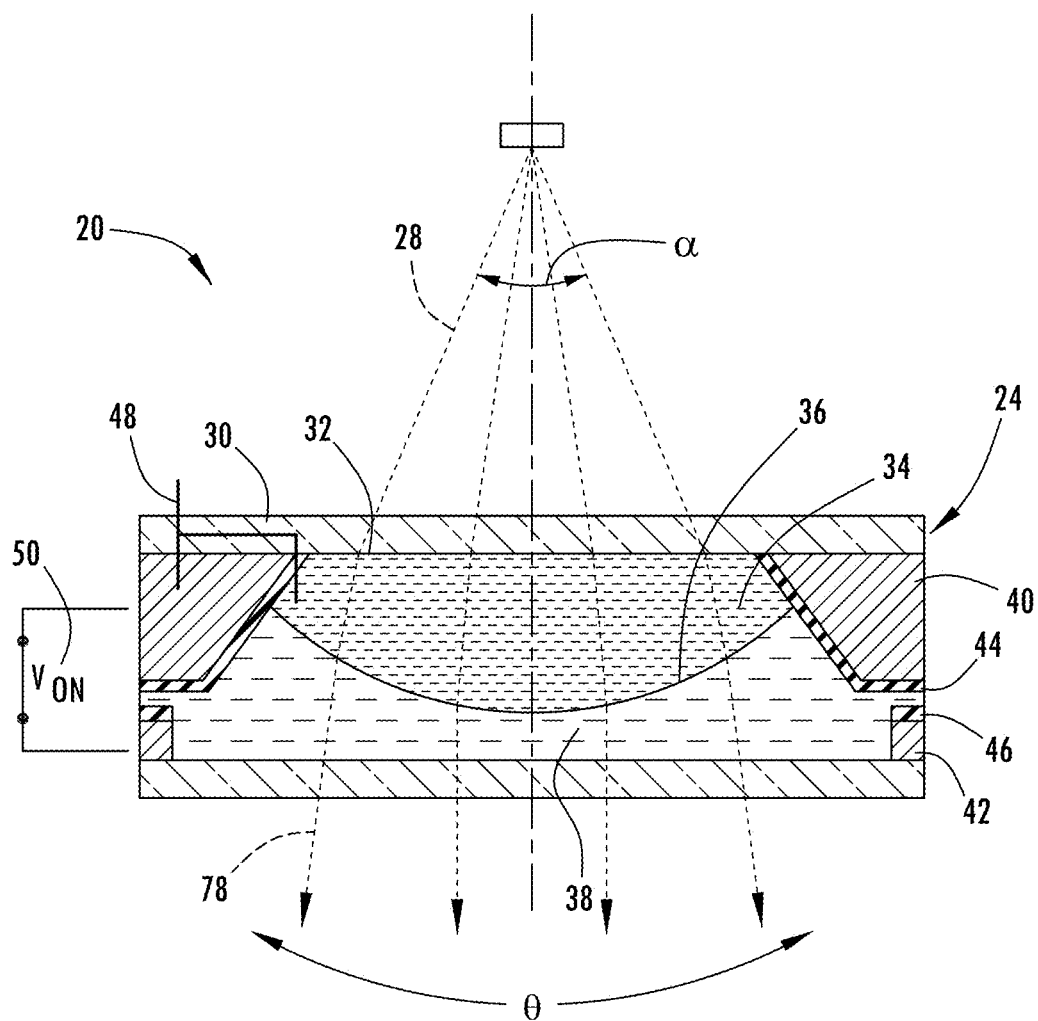
FIG. 4 is a cross-sectional view taken through line III-III of FIG. 2 illustrating the vehicle lighting system configured as a reading light.

Referring to FIGS. 3 and 4, the vehicle lighting system 20 is illustrated with the liquid lens 24 controlled in a dome light mode in FIG. 3 and in a reading light mode in FIG. 4. The vehicle lighting system 20 includes a light source 26, such as one or more light emitting diodes. In one embodiment, the light source 26 has red, blue and green LEDs for generating colored light using color mixing of the LEDs. The light source 26 generates an output light beam 28 generally within a cone-shaped beam at an angle to which in turn is projected onto and through the liquid lens 24. The liquid lens 24 is an optical lens that may be electrically controlled to change the shape of the optical membrane to change the focus of the light beam output as light from the light source 26 is projected through the liquid lens 24. The liquid lens 24 generally includes a window 30 on the upper input side and a container 32 which includes two fluid mediums of differing indexes of refraction separated by an optical polymer membrane 36. In the example shown, the container 32 contains a first fluid medium in the form of oil in a first chamber 34 of the container 32 and a second fluid medium in the form of water in a second chamber 38 of the container 32. The first fluid medium, e.g., water, has a first index of refraction that is different from the second index of refractive of the second fluid medium, e.g., oil. The first chamber 34 is separated from the second chamber 38 via the optical polymer membrane 36 that is light transparent and bendable into different dome shapes due to the pressure of the two fluid mediums. The optical polymer membrane 36 may be a light transparent polymer.

The liquid lens 24 includes a first metal contact 40 which provides a first electrode insulated via an insulator 44 and a second metal contact 42 likewise insulated via insulator 46. An electrical voltage Von may be applied by an electrical power source 50 such as a battery across the first and second metal contacts 40 and 42 to generate an electrostatic pressure 48 to change the shape of the optical polymer membrane 36. As seen in FIG. 3, when the electrical voltage is not applied, which is a first voltage of zero volts represented by Voff, the optical polymer membrane 36 assumes a first dome shape which projects the light illuminated therethrough in an output beam 78 which defines a relatively wide angle defocused beam of light to provide the dome light. The wide beam 78 may have an angle θ that is relatively large compared to a reading light. For example, the dome light may have an angle θ greater than 25°, whereas the reading light may have an angle θ less than 25°. It should be appreciated that the light beam 28 output from the light source 26 is redirected into the wide beam 78 when passing through the optical membrane 36 of the first shape shown in FIG. 3 to provide a wider field of illumination for the dome light.

Referring to FIG. 4, the vehicle lighting system 20 is shown with an electrical voltage applied by the electrical power source 50 to provide a second voltage Von such as 0-60 volts across metal contacts 40 and 42 to generate electrostatic pressure to change the shape of the optical polymer membrane 36 to a second dome shape. According to one example, the voltage may be 0-20 volts for the dome light and 45-60 volts for the reading lamp. In the second dome shape, the optical polymer membrane 36 redirects the light beam output 28 from the light source 26 into a narrower focused light beam 78 having a beam of light illumination at an angle θ configured for a reading light. The reading light provides a more focused narrow beam of light, whereas the dome light provides a broader general defocused beam of lighting. It should be appreciated that the electrical voltage may be switched between Von and Voff in response to a user input to change the shape of the optical polymer membrane 36 to adjust the focus switch between the reading light and the dome light. It should be appreciated that the voltage applied to the liquid lens 24 may be a non-zero first voltage for the reading light and a second different non-zero voltage or zero voltage for the dome light.

Figure 5:
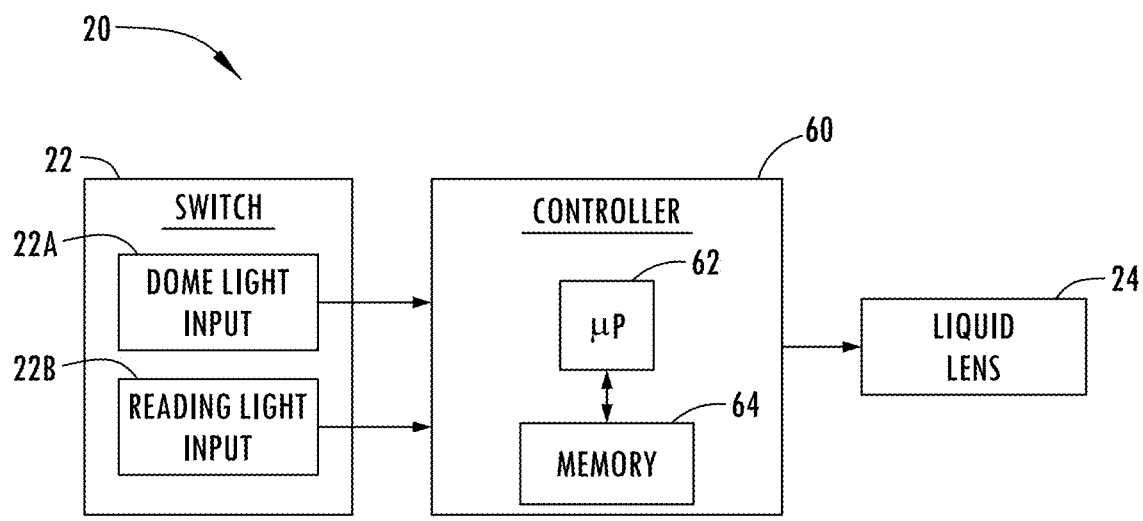
FIG. 5 is a block diagram illustrating the vehicle lighting system having a controller for controlling the lighting system, according to one embodiment.

Referring to FIG. 5, one example of a controller 60 for the vehicle lighting system 20 is illustrated. The vehicle lighting system 20 includes the controller 60 such as a digital controller, such as a microprocessor 62 and memory 64. It should be appreciated that other analog and/or digital control circuitry may be employed to control the shape of the liquid lens 24 to switch between the reading light and the dome light. The controller 60 receives inputs from the user switch 22 which may include a dome light input 22A or a reading light input 22B. Depending on the user input activated with the switch input, the controller 60 adjusts the voltage output applied to the liquid lens 24 between first and second voltages to change the shape of the optical polymer membrane to thereby change the light illumination beam to one of the reading light and the dome light, as requested by the input.

Accordingly, the vehicle lighting system 20 advantageously provides for a combination dome light and reading light in a motor vehicle 10 utilizing a light source and single lens configured as a liquid lens 24. The liquid lens allows the optical system to overcome depth of field limitations by allowing the focus to be electronically adjusted without requiring other mechanical movement. The electrically focused tunable lens may function with a low operating voltage and may adjust the focus within a very short time period such as less than 100 milliseconds. The use of the liquid lens 24 advantageously provides for a simplified and efficient vehicle lighting system 20 in a motor vehicle 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle interior lighting system comprising:
   a light source for generating light illumination;
   a liquid lens optically aligned with the light source to receive the light illumination and generate an output beam; and
   a controller configured to control electric power supplied to the liquid lens, wherein the controller applies a first voltage to the liquid lens to generate a first output beam having a first beam size and a second voltage to the liquid lens to generate a second output beam having a wider second beam size, further comprising a user input for selecting between the first voltage to generate the first output beam and the second voltage to generate the second output beam.

2. The vehicle lighting system of claim 1, wherein the first voltage is a non-zero voltage and the second voltage is zero voltage.

3. The vehicle lighting system of claim 2, wherein the first output beam is a reading light beam and the second output beam is a dome light beam.

4. The vehicle lighting system of claim 1, wherein the user input is a user actuatable switch.

5. The vehicle lighting system of claim 1, wherein the liquid lens comprises a container having an optical polymer membrane containing a fluid and an actuator with a voice coil to change the shape of the optical polymer membrane.

6. The vehicle lighting system of claim 1, wherein the light source and liquid lens are located proximate to a roof of a vehicle.

7. The vehicle lighting system of claim 1, wherein the liquid lens comprises an optical polymer membrane.

8. The vehicle lighting system of claim 7, wherein the liquid lens further comprises a first fluid medium and a second fluid medium separated by the optical polymer medium.

9. A vehicle interior lighting system comprising:
   a light source for generating light illumination;
   a liquid lens optically aligned with the light source to receive the light illumination and generate an output beam, the liquid lens comprising a first fluid medium and a second fluid medium, wherein an optical polymer membrane is disposed between the first and second fluid mediums; and
   a controller configured to control electric power supplied to the liquid lens, wherein the controller applies a first voltage to the liquid lens to generate a first output beam having a first beam size and a second voltage to the liquid lens to generate a second output beam having a wider second beam size, further comprising a user input for selecting between the first voltage to generate the first output beam and the second voltage to generate the second output beam, and wherein the first output beam is a reading light beam and the second output beam is a dome light beam.

10. The vehicle lighting system of claim 9, wherein the first voltage is a non-zero voltage and the second voltage is zero voltage.

11. The vehicle lighting system of claim 9, wherein the user input is a user actuatable switch.

12. The vehicle lighting system of claim 9, wherein the liquid lens comprises a container containing the optical polymer membrane and the first fluid medium and the second fluid medium, and an actuator with a voice coil to change the shape of the membrane.

13. The vehicle lighting system of claim 9, wherein the light source and liquid lens are located proximate to a roof of a vehicle.

14. A method of controlling a vehicle interior lighting system on a vehicle, the method comprising:
    activating a light source to generate light illumination onto a liquid lens to generate an output beam, wherein a first voltage is applied to the liquid lens to generate a first output beam having a first beam size;
    receiving a user input to select a second voltage to generate a second size beam; and
    applying the second voltage to the liquid lens in response to the user input to generate the second output beam having the second beam size.

15. The method of claim 14, wherein the first voltage is a non-zero voltage and the second voltage is a zero voltage.

16. The method of claim 14, wherein the first output beam is a reading light beam and the second output beam is a dome light beam.

17. The method of claim 14, wherein the liquid lens comprises an optical polymer membrane disposed between first and second fluid mediums.

\* \* \* \* \*